United States Patent [19]

Mita

[11] Patent Number: 5,270,838
[45] Date of Patent: Dec. 14, 1993

[54] DOCUMENT SCANNING APPARATUS FOR SCANNING IMAGE INFORMATION ON A SINGLE SIDED DOCUMENT WHETHER THE DOCUMENT IS RIGHT SIDE UP OR UPSIDE DOWN

[75] Inventor: Kikuo Mita, Yokohama, Japan

[73] Assignee: Eastman Kodak Company, Rochester, N.Y.

[21] Appl. No.: 658,490

[22] Filed: Feb. 21, 1991

[30] Foreign Application Priority Data

Jun. 14, 1990 [JP] Japan ................................ 2-157091

[51] Int. Cl.⁵ ............................................. H04N 1/40
[52] U.S. Cl. ................... 358/471; 358/406; 358/408; 358/488
[58] Field of Search ............... 358/406, 408, 471, 488; 355/319, 320

[56] References Cited

U.S. PATENT DOCUMENTS

| | | | |
|---|---|---|---|
| 3,998,543 | 12/1976 | Wick et al. | 355/232 |
| 4,924,275 | 5/1990 | Nelson | 355/319 |
| 5,038,182 | 8/1991 | Tanimoto | 355/320 |

FOREIGN PATENT DOCUMENTS 60-35752 2/1984 Japan .

Primary Examiner—Edward L. Coles, Sr.
Assistant Examiner—Thomas L. Stoll
Attorney, Agent, or Firm—Thomas H. Close; Kevin A. Sembrat; Raymond L. Owens

[57] ABSTRACT

A document scanner that is able to reliably discriminate and scan the information side of each simplex document of a stack of documents, i.e. The side containing information, even when some of the documents are upside-down.

1 Claim, 4 Drawing Sheets

DOCUMENT SCANNING APPARATUS FOR SCANNING IMAGE INFORMATION ON A SINGLE SIDED DOCUMENT WHETHER THE DOCUMENT IS RIGHT SIDE UP OR UPSIDE DOWN

BACKGROUND OF THE INVENTION

1. Field of the Invention

The present invention relates to a document scanning apparatus which scans information on just one side of the document.

2. Description of the Prior Art

Certain document scanning apparatus optically scans in a document, digitizes the document image and stores the digitized image signals or transmits them to a host computer. The ability to thus process the document image data in the form of electrical signals facilitates the speedy storage, retrieval, duplication and transmission of large quantities of such image data. Document scanners of this type are being developed to meet modern society's need for high-speed processing of growing quantities of information.

Conventional document scanning apparatus usually consist of a document feed section, a document optical scanning section and a document eject section. In a typical arrangement, a quantity of documents are stacked in the feeder section. These documents are then fed one at a time to the scanning section. At the scanning section the document is scanned by a beam of light and the light reflecting from the document is detected by an optical sensor such as, for example, a charge-coupled device (CCD), which digitizes the stream of image data. After being scanned the document is then ejected from the apparatus.

The trend is toward faster document scanners able to process large quantities of documents. However, stacks of documents to be processed often include some documents which are upside down, but with conventional scanning systems the image information on such upside-down documents will be lost. This has led to a need for a high-volume document scanning system that is also able to scan in information from upsidedown documents.

Conventionally, such loss of information from upside-down documents is prevented by manually ensuring that all the documents are stacked the right way up prior to feeding them into the scanner. This, however, works against the need to be able to speedily process large numbers of documents, and also takes time and labor.

Another technique is to employ a scanner that simultaneously scans both sides of the documents. However, as such systems reproduce images of the two sides of each document, in the case of documents which have information on one side only this system leads to half of the reproduction media being used to reproduce the non-information side of the documents, which is wasteful.

SUMMARY OF THE INVENTION

In consideration of the aforesaid shortcomings of the prior art, an object of the present invention is to provide a document scanning apparatus which is able to provide reliable scanning of documents on which image information is printed on only one side (sometimes referred to as a simplex document), even when some of the documents are upside-down, and therefore also uses image reproduction media efficiently and without waste.

For realizing this object, the present invention provides a document scanning apparatus comprising document scanning means arranged at each side of a document for scanning both sides of the document, contrast detection means for detecting the contrast as the difference between maximum and minimum brightness values in the image information, and image information selection means for comparing the contrast of the image information of each side and selecting the image information having the higher contrast.

The object is also realized by a document scanning apparatus for selecting the side of a simplex document which contains image information comprising:

document scanning means arranged at each side of the document for scanning both sides of the document;

contrast detection means for detecting the contrast of each side as the difference between maximum and minimum brightness values; and image information selection means for comparing the contrast of the image information of each side and selecting the side having the higher contrast.

The document scanning apparatus includes document scanning means arranged at each side of a document for scanning both sides of the document and binarizing the image brightness information of each side as black pixels and white pixels, and logic operation means for performing logic operations on the binarized image information from each side by assigning a binary "1" to the information from one side and a binary "0" to the information from the other side and outputting the result of the operation as one image.

In the document scanning apparatus according to the above arrangement, image information from both sides of a simplex document is scanned in by the document scanning means and the image information contrast is obtained by the contrast detection means. As the printed side of the document will exhibit high contrast while the side with no printed information will have a low level of contrast, when contrast is used as a reference the image information selection means will select and output the image information having the more pronounced contrast. As such, just the information side of the document can always be output regardless of the absence or presence of upside-down documents.

When the document scanning means is used for binarizing the image information as black and white pixels, the printed side of the document will have a higher number of black pixels, which conversely can be expressed as a lower number of white pixels. It therefore becomes possible to output just the side of the document on which information is printed by comparing the black (or white) pixel counts of each side and basing the selection of the image information on the result of this comparison.

When only one side of the documents to be scanned has printed information, the document scanning means is used for binarizing the image information of each side as black and white pixels and the binarized image information is assigned a binary value of "1" or "0" to perform logic operations on the image information from the two sides, such as logical summing (using an OR gate arrangement) and logical product (using an AND gate arrangement) operations. This enables an image output to be readily obtained that is substantially the same as the image from the side of the document on which information has been recorded.

Further features of the invention, its nature and various advantages will become more apparent from the accompanying drawings and the following detailed description of the invention.

DETAILED DESCRIPTION OF THE PREFERRED EMBODIMENT

Figure 5:
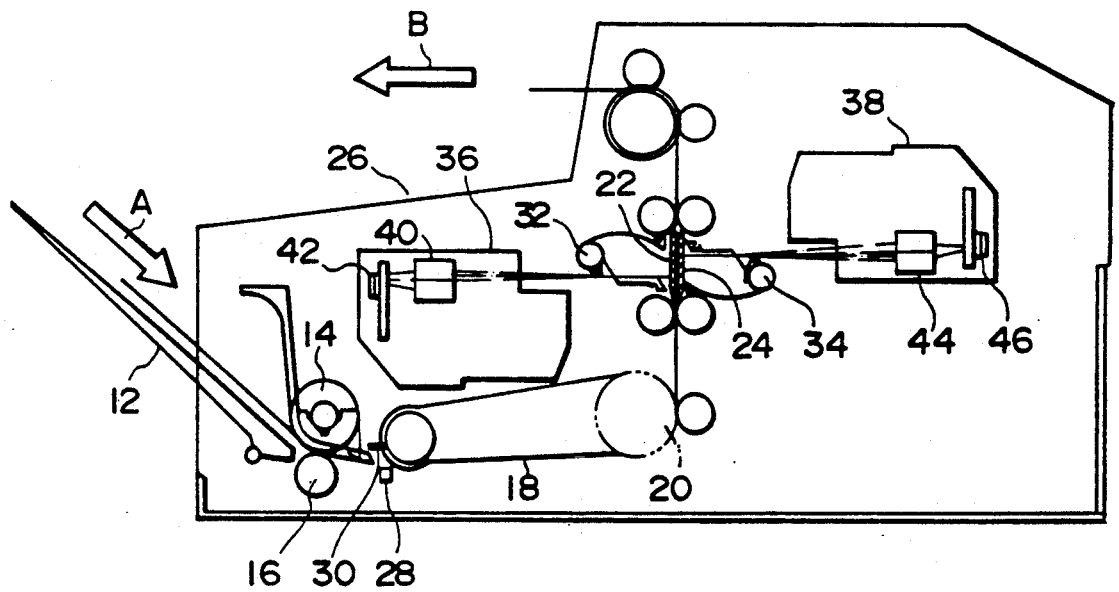
FIG. 5 is a diagram showing the general configuration of the document scanning apparatus according to the first embodiment of the present invention.

The invention will now be described with reference to FIG. 5, which is a diagram showing the overall arrangement of a first embodiment of the document scanning apparatus according to the present invention.

The document path of the illustrated apparatus has a horizontal intake and a vertical eject and is divided into a document supply section, scanning section and eject section. A simplex document is moved along the path by a motor, the motive power of which is transmitted by a gear train and pulleys. This apparatus is capable of scanning both sides of a document simultaneously, for which it is equipped with first and second light sources, and corresponding first and second scanning sections.

The document path configuration will now be described. Documents to be scanned are stacked in a document feed tray 12, which extends from a case 10. Provided near the document feed tray 12 are a feed roller 14 and a retard roller 16, arranged vertically opposite to each other. The topmost document is drawn into the apparatus in the direction indicated by arrow A by the counterclockwise rotation of the feed roller 14, while at the same time the counterclockwise rotation of the retard roller 16 serves to urge the documents below the topmost one back towards the document feed tray 12.

The feed path continues with a horizontal feed belt 18, which conveys the document to turn roller 20. The turn roller 20 marks the end of the feed path and the beginning of the vertical path. In the vertical path the document enters the scanning path, which includes a first aperture plate 22 and a second aperture plate 24. The document is scanned as it passes between these aperture plates 22 and 24. After the scanning path the document enters the ejection path, from which it is ejected in the direction indicated by arrow B, into a stocker 26.

The document path thus arranged is provided with sensors to check that documents are drawn into, and ejected from, the apparatus correctly. In this embodiment, on the document input side a document sensor 28 is provided just before the feed belt 18. This document sensor 28 is an optical one constituted of a light emitter and a light receiver.

A reflector 30 is provided above the document path. A vertical beam of light from the document sensor 28 is projected up through the document path to impinge on the reflector 30. Therefore, when there is no document to interrupt the beam the reflector 30 reflects the light back to the document sensor 28, while the intake of a document is indicated by the fact that the document interrupts the sensor beam.

In addition, if the speed at which the document is transported is known, the detection of the leading edge of the document by the document sensor 28 can be used to indicate the timing of the document's arrival at the scanning position, described below.

The arrangement of the scanning section will now be described. First and second scanning positions are formed in the central part of the respective aperture plates 22 and 24. Light sources 32 and 34 are provided to each project a prescribed beam of light at the scanning positions; in the drawing these beams of light are each indicated by a dashed line. The reflection of each beam of light from the document corresponds to the brightness of the light. The reflected light is guided to the scanning sections, described below, as indicated by dashed lines.

Scanning sections 36 and 38 are provided to read in the light reflected by the document. Specifically, the first scanning section 36 includes a lens system 40 through which light reflected from the first scanning position passes and impinges on a light receiving section 42 to thereby scan one line at a time.

The structure of the second scanning section 38 is substantially the same as that of the first scanning section 36, having a lens system 44 and a light receiving section 46, with light reflecting from the second scanning position passing through the lens system 44 and impinging on the light receiving section 46.

The document scanning operation will now be described. The topmost of the documents stacked in the document feed tray 12 is drawn into the document path by the feed roller 14 while the other documents are held back by the retard roller 16, so that documents are sequentially fed into the path one at a time.

When a document is detected by the intake side document sensor 28, the document sensor 28 sends a signal to a controller (not shown). The controller puts out a scan start command to each of the scanning sections 36 and 38, with a preset time delay based on the distance between the document sensor 28 to the scanning position and the speed at which the document is moving along the path. When the document reaches the scanning position, the reflected data from both sides of the document is scanned by the scanning sections 36 and 38 and stored. The controller can be made to cause a desired part of the document instead of the whole document by trimming the scanning position. After the document has been scanned it is ejected from the ejection path into the stocker 26. Thus the documents are scanned automatically in a continuous flow.

The light receiving sections 42 and 46 of the first and second scanning blocks 36 and 38 are each constituted as a one-dimensional line array of photosensors. The reflected light from the document is converted to electrical signals and output as image information by the photosensors of these arrays. The photosensors of the light receiving sections 42 and 46 are divided into odd and even pixels in accordance with their array sequence. With this arrangement, the output of lines of input document information alternates between odd and even pixel output. The image information output by the photosensors is input to A/D converters 48 and 50 (FIG. 1) where it is digitized.

Details of the configuration and operation of the circuitry for selecting the image information from one or the other sides of a document will now be described, with reference to FIG. 1 which is a block diagram of the arrangement of the first embodiment of the present invention.

The document scanning apparatus according to this embodiment is comprised of document scanning means, contrast detection means and image information selection means. With reference to FIG. 1, as a document 52 is being transported in the direction indicated by the arrow C, both sides of the document 52 are scanned simultaneously by the document scanning means. For this, the light sources 32 and 34 are used to illuminate the two sides of the document 52, and the light reflected by the document is formed into an image on the light receiving sections 42 and 46 by the lenses 40 and 44. The signals output by the light receiving sections 42 and 46 are digitized by the A/D converters 48 and 50 and are then read into image storage circuits 54 and 56.

The contrast detection means here comprise contrast detectors 58 and 60. The digital outputs of the A/D converters 48 and 50 are input to these contrast detectors 58 and 60. The structure of the contrast detector 58 will now be described in detail, with reference to the circuit diagram of FIG. 2. The contrast detector 60 has an identical structure.

Figure 2:
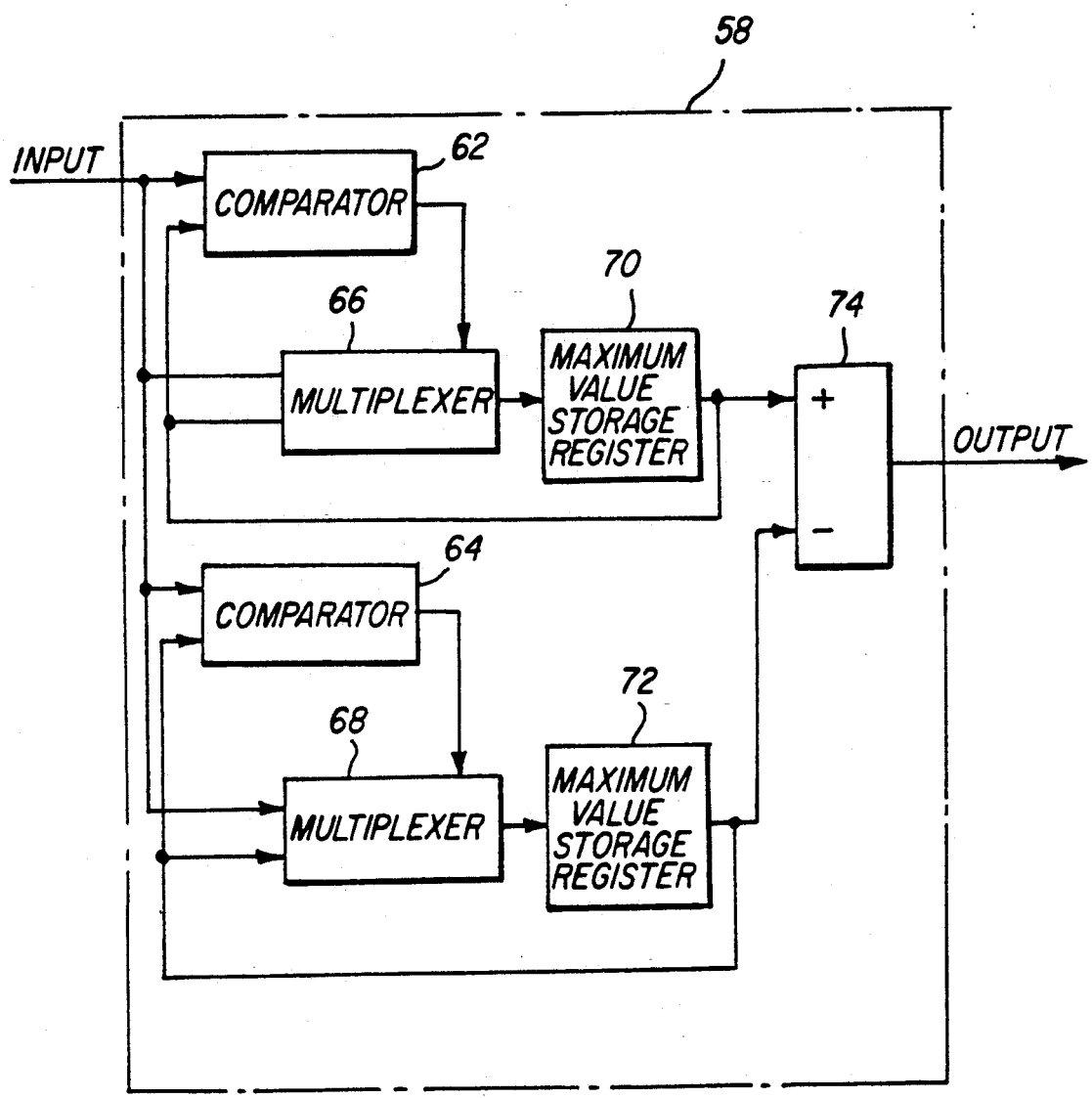
FIG. 2 is a circuit diagram of the contrast detector.

As shown by FIG. 2, the digital signals from the A/D converter entering from the input side of the contrast detector 58 are input to comparators 62 and 64 and multiplexers 66 and 68. The output of the multiplexer 66 is input to a maximum value storage register 70, and the output of the maximum value storage register 70 is input to the comparator 62 and multiplexer 66. In the same way, the output of the multiplexer 68 is input to a minimum value storage register 72, and the output of the minimum value storage register 72 is input to the comparator 64 and multiplexer 68.

The operation of the contrast detection circuit thus configured will now be explained. When a fresh signal is input to the contrast detector 58, the comparator 62 compares it with the contents of the maximum value storage register 70. If the new signal is larger than the existing maximum value, the new signal is output by the multiplexer 66 and written into the maximum value storage register 70. Thus, the brightest image signal value (maximum brightness value) is thereby stored in the maximum value storage register 70.

In the same way, the comparator 64 compares the freshly input signal with the contents of the minimum value storage register 72. If the new signal is smaller than the existing minimum value, the new signal is output by the multiplexer 68 and written into the minimum value storage register 72. Thus, the darkest image signal value (minimum brightness value) is thereby stored in the minimum value storage register 72.

When the prescribed region of a document has been scanned, the registers 70 and 72 will contain signal values corresponding to the brightest and darkest parts of the region. The outputs of the registers 70 and 72 are input to a subtractor 74 to obtain the contrast, which is the difference between the input values.

Figure 1:
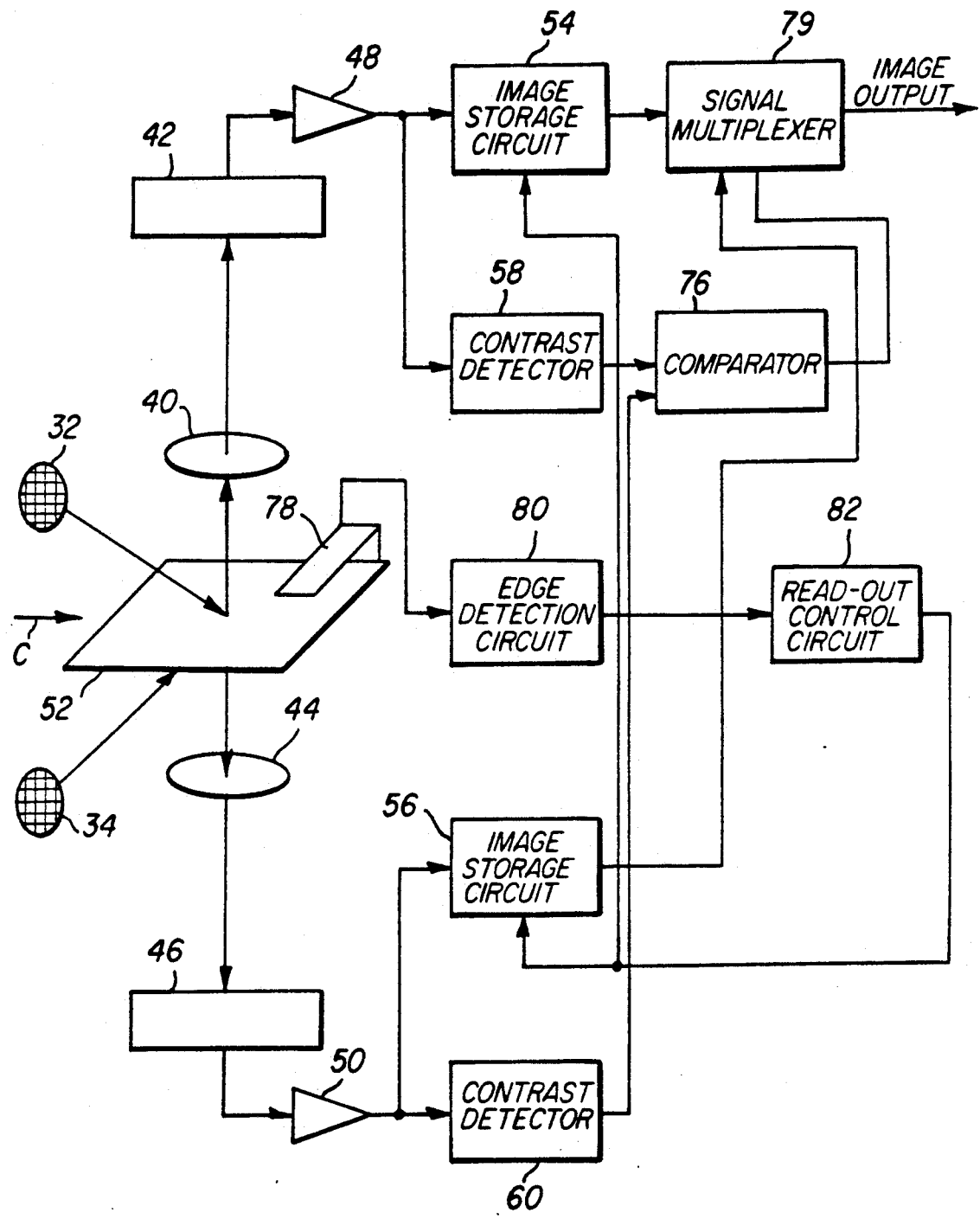
FIG. 1 is a block diagram of a first embodiment of the present invention.

Referring to FIG. 1, the contrast values obtained by the contrast detectors 58 and 60 are each output to a comparator 76 by the image information selection means. Based on the results of this comparison by the comparator 76, a signal multiplexer 79 is controlled to select and output the image information in the image storage circuits 54 and 56 which has the higher contrast.

The output from a photosensor 78 is input to an edge detection circuit 80, and when the trailing edge of the document passes the photosensor 78 the edge detection circuit 80 outputs a pulse which signifies that the scanning of the document has been completed. The pulse signal output by the edge detection circuit 80 is input to a read-out control circuit 82. This starts the read-out from the image storage circuits 54 and 56, and a page of image information corresponding to the image of whichever side of the document exhibited the greater contrast is output.

Thus, with the document scanning apparatus according to this first embodiment, both sides of the documents are scanned, the contrast value of each side is obtained, the contrast of the two sides is compared, and the side showing the higher image contrast is selected and output. This ensures that the appropriate, information-carrying side of the documents is scanned even in the case of documents which have been stacked upside-down. Furthermore, the fact that only the information-carrying side of the document is output means that the output medium is used more efficiently.

Figure 3:
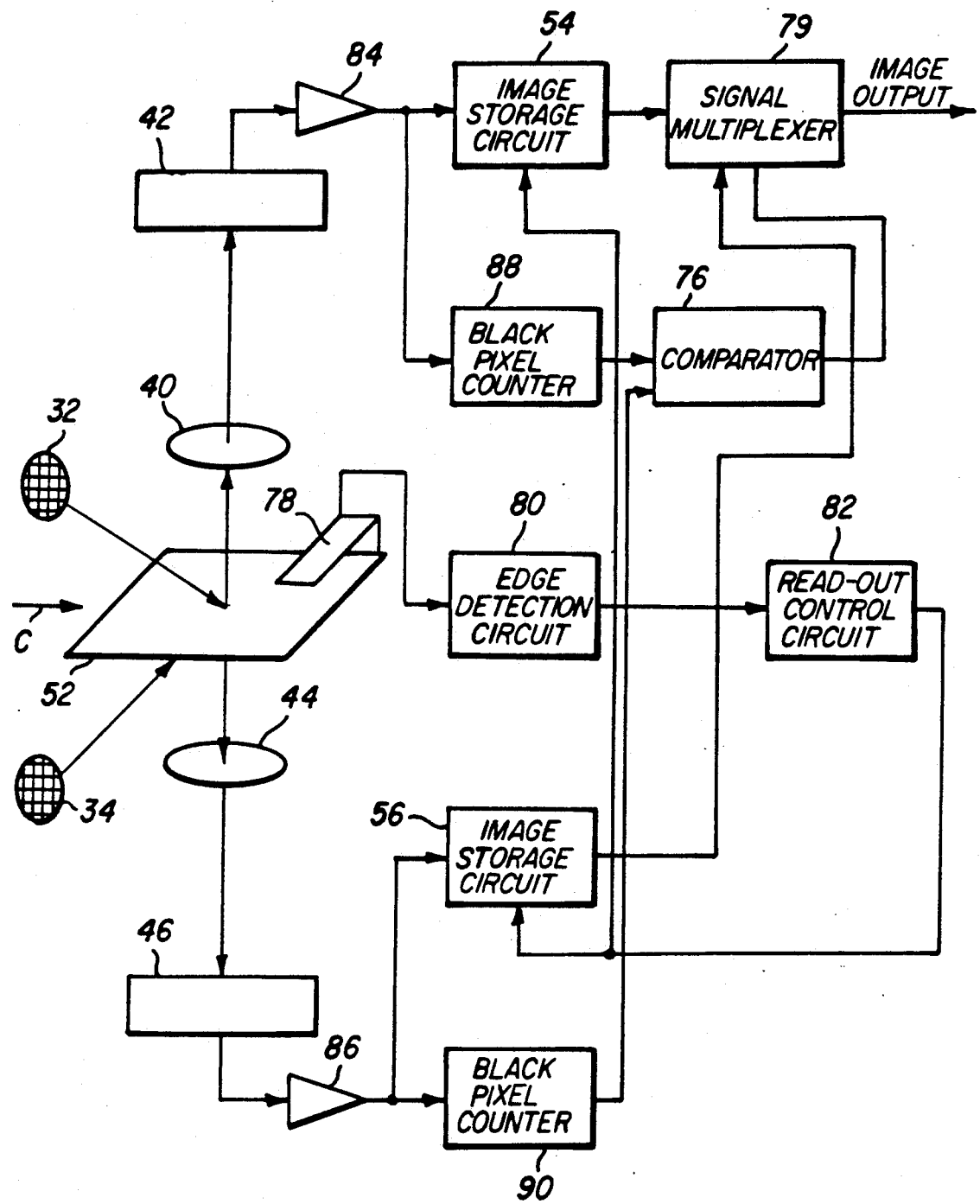
FIGS. 3 and 4 are block diagrams of other embodiments of the invention.

FIG. 3 illustrates the arrangement of a second embodiment of the invention, which comprises document scanning means, pixel counting means and image information selection means. With reference to FIG. 3, as the document 52 is being transported in the direction indicated by the arrow C, both sides of the document 52 are scanned simultaneously by the document scanning means. For this, the light sources 32 and 34 are used to illuminate the two sides of the document 52, and the light reflected by the document is formed into an image on the light receiving sections 42 and 46 by the lenses 40 and 44. The signals output by the light receiving sections 42 and 46 are binarized into black and white pixels by comparators 84 and 86 and are then read into the image storage circuits 54 and 56. In this embodiment the pixel counting means is constituted by black pixel counters 88 and 90 which only count black pixels output by the comparators 84 and 86.

Next, the black pixel count values as measured by the black pixel counters 88 and 90 are each output to the comparator 76 by the image information selection means. Based on the results of this comparison by the comparator 76, a signal multiplexer 79 is controlled to select and output the image information in the image storage circuit 54 or image storage circuit 56 having the higher black pixel count for processing.

As in the first embodiment, the output from the photosensor 78 is input to the edge detection circuit 80, and when the trailing edge of the document passes the photosensor 78 the edge detection circuit 80 outputs a pulse which signifies that the scanning of the document has been completed. The pulse signal output by the edge detection circuit 80 is input to a read-out control circuit 82. This starts the read-out from the image storage circuits 54 and 56, and a page of image information corresponding to the image of whichever side of the document has more black pixels.

In this embodiment the pixel counting means is a black pixel counter. However, the same effect can be obtained using a white pixel counter, in which case the image information with the fewer white pixels would be selected, as determined by the comparator of the image information selection means.

This arrangement ensures that the appropriate, information-carrying side of the documents is scanned even in the case of documents which have been stacked upside-down. Also, the fact that only the information-carrying side of the document is output means that the output medium can be used more efficiently.

Figure 4:
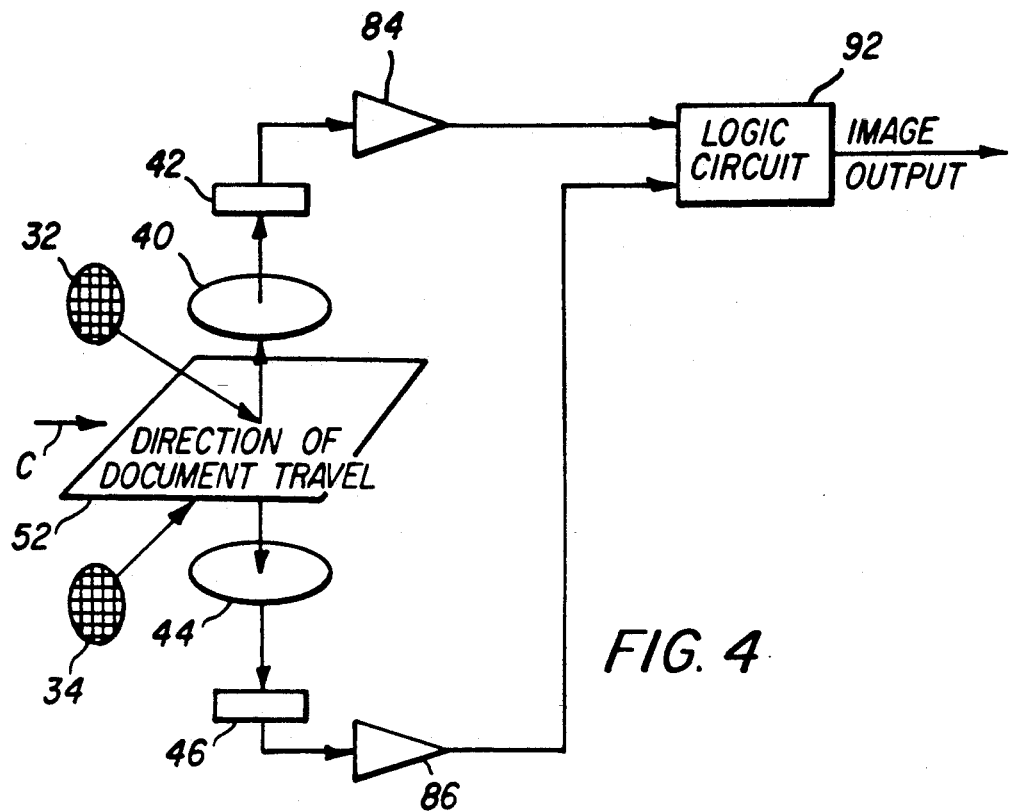

FIG. 4 illustrates the arrangement of a third embodiment of the invention. In particular this embodiment can be applied to documents in which the non-information-carrying side is uniform, with no contrast. In this embodiment the document scanning apparatus is constituted by document scanning means and logic circuits. The document scanning means has the same arrangement as that of the second embodiment. That is, with reference to FIG. 4, light sources 32 and 34 are used to illuminate the two sides of a document 52 that is being transported in the direction indicated by the arrow C, and the light reflected by the document is formed into an image on the light receiving sections 42 and 46 by the lenses 40 and 44. The signals output by the light receiving sections 42 and 46 are binarized into black and white pixels by comparators 84 and 86. Binarized white pixels are assigned a "1" and black pixels a "0", for example, and the binarized image information of each side of the document is input to a logic circuit 92.

The logic circuit 92 uses an AND gate arrangement, for example, to obtain the logical product, of the binarized image information of each side of the document and output the two sets of image information as a single image of the side of the document that has image information. This is owing to the fact that when the reverse side of the document is uniformly white, the image information output will be constituted by white pixels, i.e. one of the inputs to the logic circuit 92 will always be "1", and the logic circuit 92 will output a "0" only when black pixel "Os" from the alphanumeric characters on the front side of the document are input to the other terminal of the logic circuit 92, enabling the image of the front side of the document to be obtained.

Instead of an AND gate, an OR gate can be used to obtain logical sums, which will provide the same effect in the case of documents that have a uniform carbon layer on the reverse side which produces a constant "0" output.

The invention has been described in detail with particular reference to certain preferred embodiments thereof, but it will be understood that variations and modifications can be effected within the spirit and scope of the invention.

what is claimed is:

1. A document scanning apparatus for scanning image information from a simplex document having printed matter on solely one side of a front side and a reverse side, said document scanning apparatus comprising:

document scanning means arranged at each side as black pixels and white pixels on a pixel by pixel basis;

pixel counting means for counting the number of binarized black pixels or white pixels on said front side and said reverse side; and pixel information selection means for comparing black pixel or white pixel counts of each side, as counted by said pixel counting means, and selecting the image information from solely one side of said front and said reverse side of the document, said selection based on the side having the higher pixel count.

* * * * *